June 12, 1934.  L. H. THOEN  1,962,536
LAND VEHICLE
Filed Sept. 29, 1930  3 Sheets-Sheet 1
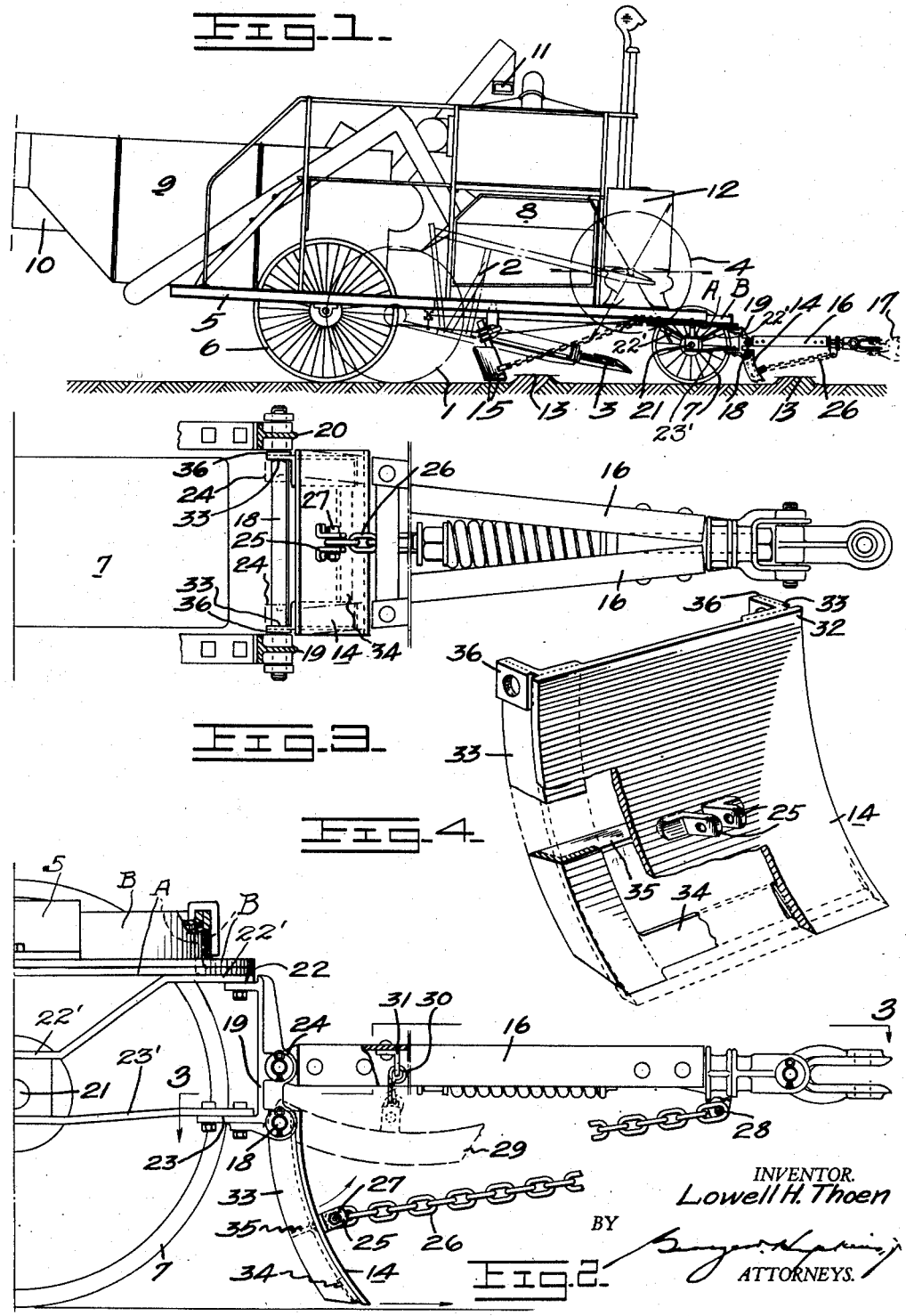
INVENTOR.
Lowell H. Thoen
BY
ATTORNEYS.

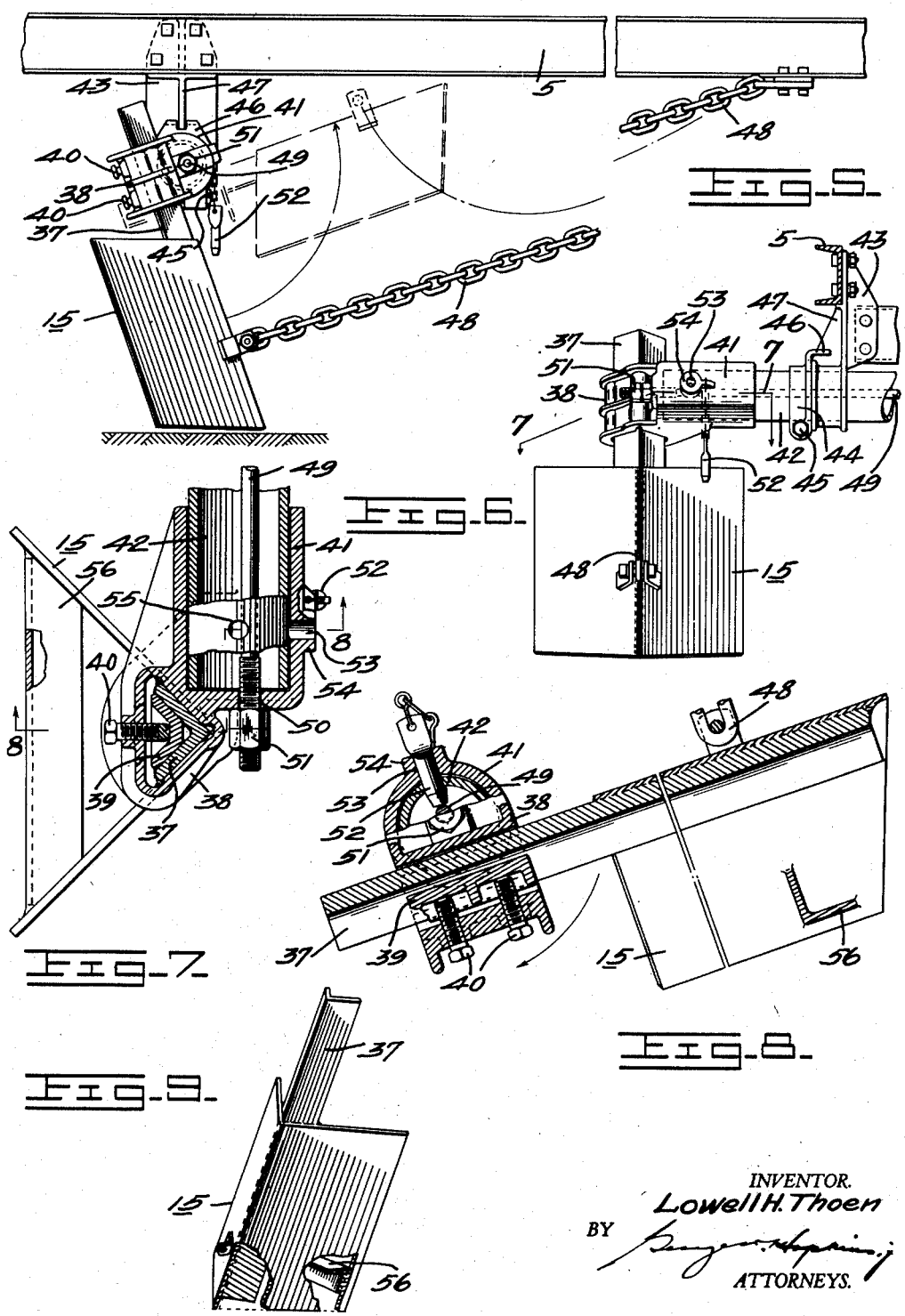

June 12, 1934.   L. H. THOEN   1,962,536
LAND VEHICLE
Filed Sept. 29, 1930   3 Sheets-Sheet 3

INVENTOR.
Lowell H. Thoen
BY
ATTORNEYS.

Patented June 12, 1934

1,962,536

UNITED STATES PATENT OFFICE 1,962,536

LAND VEHICLE

Lowell H. Thoen, Alameda, Calif., assignor to Caterpillar Tractor Co., San Leandro, Calif., a corporation of California Application September 29, 1930, Serial No. 485,142

4 Claims. (Cl. 280—160)

This invention relates to improvements in land vehicles and particularly to those which are used on rough ground; and the objects of my improvements are: to provide a means on a land vehicle for smoothing the ground on which the vehicle is to bear; to provide a land vehicle such as a combined harvester-thresher with check breakers; to provide a check breaker construction which is efficient in operation and which can be economically manufactured; and to provide a check breaker on a combined harvester-thresher which can be controlled from the operator's platform. These objects are attained by the mechanism illustrated in the accompanying drawings.

Description of figures

Fig. 1 is a right side elevation of a machine embodying the invention, disclosing check breakers mounted in front of the wheels of a combined harvester-thresher.

Figs. 2 to 4 illustrate the form of check breaker associated with the front wheel in Fig. 1.

Fig. 2 is a right side elevation thereof.

Fig. 3 is a plan view of the mechanism shown in Fig. 2 taken on the line 3—3 in Fig. 2.

Fig. 4 is a perspective view of the check breaker with portions broken away to illustrate its construction.

Figs. 5 to 9 illustrate the form of check breakers associated with the rear wheels in Fig. 1.

Fig. 5 is a right side elevation thereof.

Fig. 6 is a front elevation.

Fig. 7 is a view taken from the line 7—7 in Fig. 6 with parts broken away and in section to illustrate the construction of the blade and its support.

Fig. 8 is a sectional view taken on the line 8—8 of Fig. 7 with the parts occupying approximately the position illustrated in dotted lines in Fig. 5.

Fig. 9 is a perspective view with parts broken away.

Fig. 10 is a right side elevation.

Fig. 11 is a front elevation.

Similar numerals refer to similar parts throughout the several views.

Description of mechanism

Figure 10:
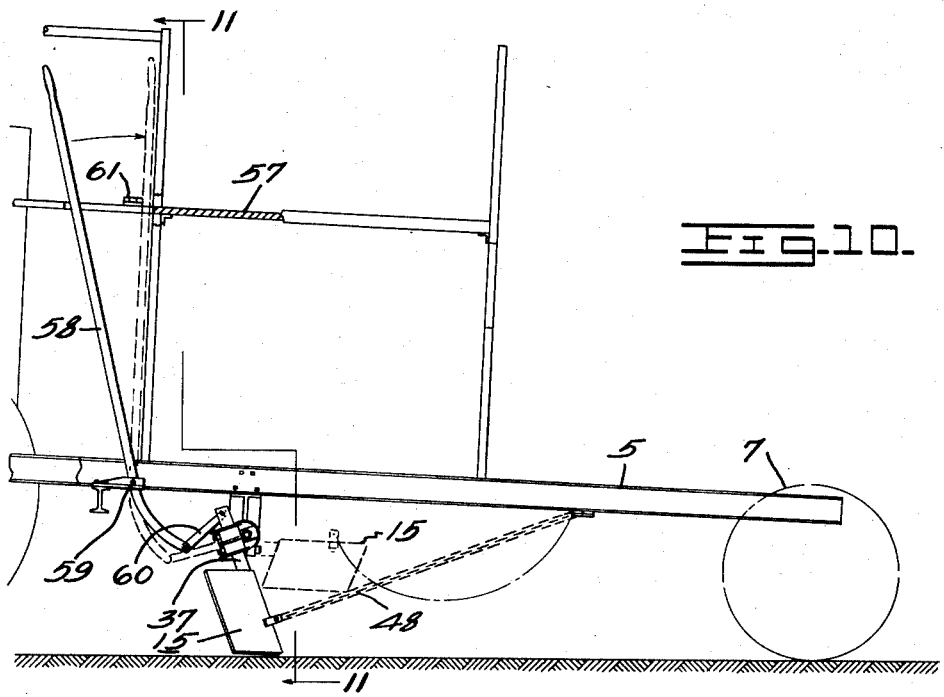
Figs. 10 and 11 illustrate the mechanism by which the check breaker is adjusted from the operator's platform.

The vehicle chosen for illustration is a combined harvester-thresher which is composed of the usual harvesting mechanism suggested in Fig. 1 by supporting means as wheel 1, framework 2 carried thereon and supporting at its leading lower edge sickle bar 3, and by reel 4 which cooperates with sickle bar 3 in placing the cut grain on the draper for delivery into the feeder house 8. From there the grain passes through the thresher and separator 9 from which the straw is delivered at 10 and grain kernels at 11. A power plant 12 is usually provided for driving the working parts of the harvesting and threshing mechanisms. The threshing machine is supported on a main frame 5, having three-point support on rear wheels 6 and front wheel 7 and is provided with a drawbar 16 for connection to a tractor, as at 17. The framework 2 of the harvester is connected to the frame 5 in the usual manner.

The surface of the ground on which machines for this purpose operate is frequently quite uneven, particularly in those localities where irrigation is resorted to, in which case checks 13 are usually formed to retain the water. To harvest grain grown in this manner, the harvesting machine is subjected to severe strain in passing over the uneven ground and check breakers constructed in accordance with the invention are particularly useful under these and similar conditions of operation.

The purpose of the check breaker is to break the check and to otherwise smooth the surface of the ground in advance of the wheel. In practice, these check breakers take different forms and for purposes of illustration, one form 14 is shown associated with front wheel 7. Another form 15 is shown associated with rear wheels 6.

Check breaker 14 as shown in Figs. 2 and 3 is pivoted on pivot rod 18 carried in two brackets 19 and 20 which are supported from and connected at 22 and 23 to members 22' and 23' which are attached to axle 21 upon which wheel 7 is mounted. As can be seen from Fig. 1, axle 21 is mounted for rotation about an upright axis to provide for steering of wheel 7, by means of the usual ring A which is secured to members 22' and is rotatable in fixed ring B; ring B being secured to main frame 5. This type of mounting for steerably supporting the front wheel 7 is well known, as can be seen from the patent to Draper, No. 398,711, dated February 26, 1889. The drawbar consists of two converging members 16 which at their divergent ends are pivoted in brackets 19 and 20 at 24. At its forward end the drawbar is provided with the usual means for connecting the combined harvester-thresher to a tractor. Secured to the face of blade 14 are two angle brackets 25 in which one end of chain 26 is fastened by bolt 27. The forward end of the chain is attached to the drawbar by means of pin 28 suitably carried thereby. The plate 14 can be adjusted to different positions of inclination with respect to the ground by connecting different links of chain 26 at 28 to alter the length of chain connection from drawbar to blade. When the vehicle is being drawn over the field, blade 14 in meeting with obstacles on the ground has a tendency to rotate about its pivot. This rotation, however, is constrained by the chain 26 which holds blade 14 in the position to which it has been adjusted for removing the obstruction. When the blade is not in use, it may be swung to the dotted line position 29, Fig. 2, where it is retained by hook 30, carried in an angle bracket 31 riveted to the drawbar.

Fig. 4 illustrates that the blade construction comprises a curved plate 32, reinforced along its vertical edges by angles 33 and along its cutting face by plate 34 and is stiffened across the back, opposite the chain connection, by a rib 35. Increased bearing surface at the pivot points is obtained by attaching square plates 36 as shown. The tool is readily fabricated by welding the parts together.

Figure 11:
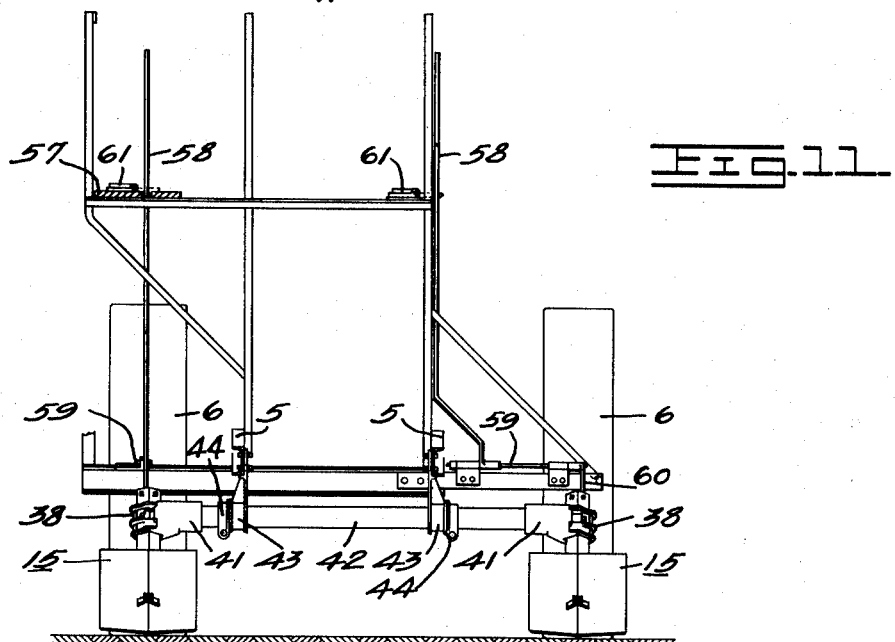

Blade 15, illustrated in Figs. 5 to 9, is V-shaped, as is particularly shown in Figs. 7 and 9. Blade 15 is supported on angle bar 37 which is adapted to be adjustably clamped in a bracket 38 by a bearing plate 39 and screws 40 threaded into bracket 38, which, as shown in Fig. 7, is formed with an aperture to receive angle bar 37 and the parts for clamping. Bracket 38 has integral therewith hub portion 41 for attachment to hollow shaft 42 which extends across the machine (Fig. 11). Brackets 38 are retained on shaft 42 by rod 49 which passes through apertures 50 in each bracket and is provided with nuts 51. Shaft 42 is located in brackets 43 by collars 44. Figs. 5 and 6 show that collar 44 is provided with clamp screw 45 and notched lug 46 for engagement with vertical web 47 of bracket 43.

Blade 15 and its supporting bar 37, with which it is integral, is not only adjustable in and out of bracket 38, but angularly with respect to shaft 42 by shortening chain connection 48. When not in use the parts are swung to the dotted line position in Fig. 5 and retained by means of retainer pin 52 which is adapted to pass through aperture 53 in a boss 54 in hub 41 and also through an aperture 55 in shaft 42.

It will be noted particularly from Figs. 7 to 9 that the blade portion is formed of a plate bent at substantially a right angle to which is preferably welded the angle bar 37, and also that angle bar 56 is welded across the back of the blade to reinforce it.

In order to enable the operator of the machine to adjust the check breakers without leaving the platform 57, Fig. 10, levers 58 are pivoted to the main frame 5 as at 59 and are connected by links 60 to angle bars 37. By this means the check breakers can be swung to the inoperative position, shown in dotted lines by moving levers 58 in the direction of the arrow in Fig. 10 where they may be retained by suitable latches 61.

I therefore claim as my invention:

1. In a harvester-thresher, a wheel, means for steerably mounting said wheel, a check breaker in advance of said wheel and carried by said means, another wheel on said harvester-thresher, and a check breaker in advance of said other wheel.

2. In a land vehicle, ground-contacting means to support said vehicle for movement over the ground, a tool, means for supporting said tool in front of said ground-contacting means, comprising a support rotatably mounted on said vehicle, means to secure said tool to said support, a draft connection, and restraining means extending from said tool to said draft connection.

3. In a land vehicle, ground-contacting means to support said vehicle for movement over the ground, a tool, means for supporting said tool in front of said ground-contacting means, comprising a transverse shaft on said vehicle, a bracket rotatably mounted on said shaft, said tool being slidably mounted for adjustment with respect thereto on said bracket, means to secure said tool in adjusted positions on said bracket, and a connection between said bracket and said shaft to prevent relative movement therebetween.

4. In a harvester-thresher, a wheel, means for mounting said wheel for turning movement about an upright axis extending transverse to the axis of rotation of said wheel, a check breaker in advance of said wheel and mounted for turning movement with said wheel, another wheel on said harvester-thresher, and a check breaker in advance of said another wheel.

LOWELL H. THOEN.